Patented Aug. 14, 1934

1,970,510

UNITED STATES PATENT OFFICE

1,970,510

RESIN AND BALSAM PREPARED WITH THE AID OF AN INORGANIC BODY AND PROCESS OF MAKING SAME

Carleton Ellis, Montclair, N. J., assignor to Ellis-Foster Company, a corporation of New Jersey No Drawing. Application October 1, 1927, Serial No. 223,478

25 Claims. (Cl. 260—8)

This invention relates to resins, balsams and analogous products, prepared with the aid of a reaction-modifier, and to the process of making same, and relates particularly to products resulting from reaction between organic bodies containing hydroxy, and the like, and those preferably containing the carboxyl or acid anhydride group or groups, all as altered in melting point and solubility, oriented in chemical composition or otherwise changed by said reaction-modifier.

Much of the subject matter of the present application is derived from Serial No. 609,136, filed on Dec. 26, 1922, now Patent No. 1,897,977, of which the present application is a continuation in part.

More specifically my invention is concerned with the products derived from the reaction between an organic acid or plurality of such acids, a hydroxy body or analogous compound and a reaction-modifier.

GROUP I

Organic acids

The organic acids (including their anhydrides) embrace a wide range of bodies. These include aliphatic and aromatic mono-carboxy or monobasic acids and the poly-carboxy or polybasic acids. The latter, of course, comprehend the di-carboxy acids. These groups comprise saturated and unsaturated acids; oxy or hydroxy acids; aldehyde acids, ketone acids and other acids containing substituent radicals composed solely of various assemblages of two or more of the elements C H and O. Other acids are those formed by substitutes of a different elemental character such as nitro, sulpho, chloro, bromo acids, and the like. Included with the aromatic acids are the reactive terpene acids. The cyclic acids of the aliphatic series or those containing both the aromatic nucleus and a cyclic aliphatic group also fall within the range of the acids whose use is not precluded under the present invention. Naphthonic acid may be utilized.

Many of the foregoing organic acids are crystalline substances and these to a large degree contain in the molecule not over 10 or 12 carbon atoms. A few are water-soluble liquids or viscous bodies, and these as a rule weaken the resistance of the resulting complex towards water. This usually is disadvantageous in applications as coating compositions, but sometimes water-instability or water-solubility of the complex may be employed to advantage.

The fatty acids derived from the various natural animal and vegetable fats and oils, in other words, those of the natural glycerides, confer distinctive properties on the complex, including a notable degree of water-stability. The glycerides themselves likewise may be used, but being less reactive and assimilable than the free fatty acids they call for special procedures to bring the reaction to a satisfactory stage of completion or assimilation. These fatty acids generally have 16 to 18 carbon atoms in the molecule. Exceptions are the fatty acids of cocoanut oil, laurel oil, and the like, containing lauric acid (having 12 carbon atoms) and several fats and oils containing arachidic, erucic, behenic and similar acids containing over 18 carbon atoms. The employment of fatty acids (or their glycerides) containing one (mono) or more (poly) hydroxyl groups is not precluded. Oxidized fatty acids (blown oils) also are included.

A readily and cheaply available form of higher fatty acids is that obtained from the "soap stock" produced in the refining of glycerides, especially vegetable glycerides. Such acids may be modified and clarified by vacuum distillation.

Still another class of organic acids readily available are those of the natural resins. These are composed or contain reactive acids which are capable of adequately coupling the resin to the complex to yield products of utility.

More specifically the organic acids which may be used include succinic, citric malic, malo-malic, mucic, maleic, fumaric, tartaric, pyro-tartaric, glutaric, lactic, acrylic, adipic, hydracrylic, glycolic, azelaic, diglycolic, glyoxylic, suberic, hydroxy-butyric, aceto-acetic, pyro-racemic, pyruvic, benzoic, chlorobenzoic, nitrobenzoic, benzoyl-benzoic, toluyl-benzoic, cinnamic, salicylic, diphenic, naphthoic, naphthalic, toluic, hydrocinnamic, amino-benzoic or anthranilic, camphoric and the like. Liquid acids of the lower aliphatic acid series, such as propionic and chloracetic, generally are used only in a very restricted way, owing to the resulting physical properties, lack of water-stability, and so forth.

Some of the foregoing acids are not particularly heat-stable and since the preferred form of making the complex is by heat treatment, I prefer to employ those acids which react easily with the other raw materials, but do not break down readily into carbon dioxide or other bodies not contributing to the yield of complex. Benzoic, phthalic and even salicylic acids are good examples of heat-stable reactive acids of the non-carbonizing type giving complexes of light color and in good yield. Of these, phthalic acid being cheaply prepared as the anhydride by the catalytic oxidation of naphthalene is highly appropriate and is therefore used largely in the following illustrations.

In using the term organic acid it should be understood that I include the anhydrides as also substances generating or rendering available any acid of a suitably reactive character.

Organic acids, which, besides conferring water-stable qualities on the complex, to a greater or lesser extent, have good heat stability within the range of heat treatment preferably contemplated are the higher fatty acids, or, generally speaking, the fatty acids of the animal and vegetable oils. These embrace the fatty acids of lard, tallow, neat's-foot, seal, whale, menhaden, cod, cocoanut, palm kernel, peanut, olive, cottonseed, corn, soya, palm, rape, sesame, linseed, tung, perilla and sunflower oils and their oxidized, blown or hydrogenated, chlorinated or otherwise substituted derivatives. These oils include such acids as lauric, myristic, palmitic, stearic, oleic, erucic, behenic, linoleic, linolenic and clupanodonic acids.

Other and possibly more anomalous raw materials are the free acids of cocoa butter, japan wax and castor oil.

The fatty acids of cottonseed oil "soap stock" distilled under reduced atmospheric pressure, are commercially available at relatively low cost and serve as a cheap supply of mixed fatty acids light in color. For a number of uses to which the complex is put, color is an important consideration. The lighter the color, the greater the degree of adaptability of the complex and the wider its market. In the one form of the invention I am able to produce a complex which is almost water-white and transparent, when viewed in thin layers. Dark brown or black products, e. g., resembling asphalt in color, are of course, easier to prepare, but their field of utility in coating compositions is comparatively limited, and they are more appropriately employed in molded plastics and the like.

As indicated, the animal or vegetable oils themselves, in lieu of their fatty acids, may be employed by using special procedures such as are illustrated herein. Mixtures of the different oils may be used with or without inclusion of their free fatty acids. Likewise mixtures of the free fatty acids of different oils, especially those having differing chemical characteristics such as cottonseed acids and cocoanut acids, are desirable for certain purposes.

The various natural resins of commercial significance have acid properties and are reactive to form a complex suitable for various coating compositions. Hard products may be made with the aid of some of the copals such as the rather readily obtained congo. Pontianak copal, kauri, and the like, also may be utilized. For coating compositions solubility is important and these resins are desirably cracked by heat treatment. Heat may be applied sufficient to destructively distill over, for example, about 20 per cent of the weight of the resin when the solubility will be found satisfactory for most purposes and the resin despite the heat treatment will, nevertheless, be found reactive with the other raw materials entering into the complex.

Other resins are dammar, sandarac, mastic, elemi and particularly rosin and oxidized rosin. Rosin may be employed as the sole natural rosin, or it may be admixed with other resins. Products containing any large proportion of rosin are not as desirable on exposure as those made with some of the other raw materials mentioned.

Oxidized rosin may be made by pulverizing ordinary rosin and exposing to warm air at a temperature below the melting point and as oxidation progresses the melting point rises, hence the temperature may gradually be increased. The rosin may contain an oxidizing catalyst such as a lead or manganese compound. Oxidation also may be caused to take place by blowing air through molten rosin in the presence of a catalyst or by treatment with hypochlorite or other chemical oxidizing agents. Oxidized rosin does not have the tackiness characteristic of ordinary rosin and possesses a considerably higher melting point if well oxidized. Some of the other oxygen-absorbing resins likewise may be oxidized.

In some cases it is desirable to incorporate a comparatively inert resin such as cumaron resin in the complex, not necessarily in chemical combination, but as a fluxing agent, or otherwise, to modify the character of the complex by simple blending, or by such mild action as may occur on heating.

While light color, solubility in appropriate organic solvents and resistance to atmospheric action are considerations of importance when the complex is to be used in coating compositions, these qualities, especially solubility, are of less significance when the complex is to be used in making plastic molding compositions, insulation, and the like. Uncracked copal may be used in the latter composition in some cases.

GROUP II

*Oxygenated bodies reactive with those of Group I*

These include bodies of quite differing chemical character embracing

1. Glycerol, in its various forms,—dilute, concentrated, crude or refined.

2. Polyglycerols, or a mixture of polyglycerols and glycerol.

3. Various glycols, such as ethylene or propylene glycol.

These may be derived from petroleum gases, by suitable reaction. Mixtures of glycols sometimes obtained from this source may be used to advantage.

4. Polyhydric alcohols containing a substituent in the hydroxyl, e. g., mono or dimethyl or propyl ether of glycerol. The mono ethyl ether of ethylene glycol has one hydroxyl free for reactive purposes. The glycerol and the glycol derivatives behave quite differently in the reaction, owing to different polymerizing tendencies and other properties.

5. Glycol ethers (inter-ethers). The condensation of two or more molecules of a given glycol yields inter-ethers; e. g., two molecules of ethylene glycol condense to dihydroxy diethyl ether, three molecules give the dihydroxy triethyl diether, and so on.

6. Chlorhydrins or other halohydrin.

7. Ethylene oxide and particularly its homologues, e. g., butylene oxide.

8. Mannitol and analogous substances.

9. Pentaerythritol.

Various inorganic substances alter the course of the resinification, either accelerating the reaction (thus serving as catalysts) or by orienting and altering the character of the resinification, and in some cases, entering into actual combination with the resin-forming material, or some of the raw materials used therein, to produce new types of resinous substances.

Inorganic reaction-modifiers

Among the inorganic acid substances available for the purpose are, on the one hand, such common acids as phosphoric, boric, chromic and sulphuric acids including their acid salts such as sodium or ammonium bisulphate; while on the other hand rarer acids such as silico-tungstic acid may be used, thus embracing a wide range of acid bodies of the inorganic domain.

In the following there is set forth a number of examples which will serve in an illustrative way.

Thus, as noted in Serial No. 609,136 boric acid is heated with tartaric acid and glycerol in the proportion of 31 parts boric acid, 75 parts tartaric acid and 46 parts glycerol, giving, at 140° C., a transparent, amber-colored mass soluble in hot water; at 160° C. an opaque, brittle product, also soluble in hot water, is obtained. Boric acid, phthalic acid and glycerol also yield solid glossy products.

Phosphoric acid added to a mixture of phthalic anhydride and glycerol accelerates the reaction of resinification. For example, 10 per cent by weight of phosphoric acid was added to these substances admixed in molecular proportions.

|  | Without phosphoric acid | With 10 percent phosphoric acid |
| --- | --- | --- |
| Reaction started | 185° C. | 142° C. |
| Solidification point | 235° C. | 210° C. |

The glycerides of maleic and of fumaric acid formed in the presence of phosphoric acid polymerize at lower temperatures in the presence of phosphoric acid.

Different results are obtained using phosphorus pentachloride. Phthalic acid and glycerol in molecular proportion were mixed with 10 to 15 per cent of phosphorus pentachloride with constant stirring. On heating under reflux condenser without agitation the mixture darkened rapidly at a temperature near the melting point of phthalic anhydride and started to froth. The frothing continued for some time without any external heat being applied. On cooling, a dark resinous mass was obtained which was hard and brittle. When a similar reaction mixture was heated with agitation it was observed that the mix became liquid and transparent below the melting point of phthalic anhydride. The first traces of water were given off at 155° C. and at this point the liquid darkened slightly. The separation of water continued until the temperature reached 170° C. and then stopped. At 210° C. thickening occurred and water was given off a second time. Rapid solidification to a spongy solid took place at 215° C. followed by a spontaneous rise in temperature to 230° C. The resulting product is a porous, hard, infusible solid, slightly dark in color.

Phosphorus trichloride and oxychloride may be used in like manner.

In one case cottonseed phthalic glyceride resin was treated
(A) With 1 per cent phosphorus trichloride
(B) With 1 per cent phosphorus oxychloride
the resin in each case being dissolved in a mixture of equal parts of benzol and ethyl acetate. The resin used was slightly tacky, but after treatment by either (A) or (B) the tackiness disappeared. The viscosity in solution was greater with (A) than (B).

A mixture of phthalic anhydride 160 parts by weight, glycerol 77 parts, and cottonseed fatty acids (distilled) 90 parts, was heated and a current of sulphur dioxide gas passed therethrough. The temperature was raised gradually to 240–250° C. At this stage the thermometer in the heating receptacle broke and almost immediately after the mercury had come in contact with the molten reaction mixture the latter solidified to an infusible mass.

In another case similar proportions of the raw materials were heated together while a slow current of sulphur dioxide was bubbled through the melt. The temperature was raised to 290° C. On opening the reaction vessel to withdraw a sample a crust of polymerized products formed on the surface of the melt. The remainder was poured out and was found to be largely soluble in alcohol-benzol mixture. On evaporation of the solution a resin was obtained which had an acid number of 31. The solution of this resin applied as a coating or varnish showed relatively good resistance to water; a test panel not whitening on standing in water for several hours.

Sulphuric acid in considerable proportion (10 per cent) causes too violent a reaction with phthalic anhydride and glycerol and a lesser proportion of the mineral acid ordinarily should be used. Or, the acid salts of sulphuric acid may be used, such as ammonium bisulphate (Serial No. 609,136) or sodium bisulphate. Using molecular equivalents of phthalic anhydride and glycerol, 10 per cent by weight of sodium bisulphate (calculated on the total weight of the other ingredients) was distinctly active. Reaction started at 135° C. and spontaneous solidification took place between 160–165° C. with the formation of light brown hard complex, infusible on heating. It is insoluble in water and rather difficultly soluble in organic solvents such as alcohol-benzol mixtures.

Silico-tungstic acid used in the proportion of 10 per cent acts somewhat too vigorously. Reaction starts at 115° C. and at 120–125° C. the mix becomes very viscous. The jelly-like mass which forms under the influence of this reaction-modifier darkens rapidly and an odor resembling burning sugar can be detected at the outlet of the air-condenser (reflux condenser) attached to the heating receptacle. The temperature increases without application of external heat, reaching 160° C. at which point the batch becomes liquid again. On cooling, very dark hard fusible resin was obtained, substantially altered physically and chemically by this reaction-modifier.

Proceeding in a somewhat different manner, a mixture of phthalic anhydride and glycerol was first brought to the melting point (135–140° C.) and silico-tungstic acid was introduced gradually. With less than 1 per cent the temperature could be raised to 200° C. without solidification. The temperature was reduced to 140° C. and silico-tungstic acid sufficient to make 2 per cent was added. The marked influence of this proportion was readily noticeable although solidification did not occur, a fusible product being obtained. When 4 per cent of silico-tungstic acid was introduced at 140° C. frothing began immediately followed by spontaneous rise in temperature. Solidification took place at 155° C. as a result of such spontaneous heating and a hard slightly-dark infusible resin resulted.

Phospho-tungstic acid has a much milder action. Thorium nitrate and uranium nitrate likewise are mild. With the latter, reaction starts at about 130° C. (evolution of water) and an increase in the viscosity of the melt up to 200° C. There were no frothing or solidification phenomena. On cooling the product was a transparent yellow resin, somewhat sticky, fusible and slightly affected by water.

Reaction between phthalic anhydride, glycerol and the fatty acids of a vegetable oil may be modified by ammonium bisulphate. For example, 54 parts by weight of phthalic anhydride, 20 parts glycerol and 1 part ammonium bisulphate were heated in a receptacle without mechanical agitation. At 150-160° C. considerable darkening occurred. 15 parts of linseed oil fatty acids were added and the temperature was gradually increased to 220° C. to obtain a homogeneous product, dark brown in color, and soluble in a mixture of benzol and alcohol equal parts. During the above heating operation the odor of acrolein was observed, showing that decomposition and modification was taking place.

When using the same proportions and procedure as that employed when using the ammonium bisulphate, but using sodium bisulphate in its place, a resin of almost identical appearance, but with slightly lighter color resulted. The resin was quite hard and had a certain measure of toughness.

When employing like proportions in the same manner, but using a mixture of equal parts of ammonium bisulphate and zinc chloride, employing 1 part of this mixture to 54 parts phthalic anhydride, 20 parts glycerol and 15 parts linseed oil fatty acids, a resin was obtained of a generally similar character, but slightly lighter in color than that produced by the ammonium bisulphate, or the sodium bisulphate used singly.

Employing the composition of Serial No. 609,136 of phthalic anhydride, glycerol and oleic acid, the following results are obtained with ammonium bisulphate.

|  | Parts |
|---|---|
| Phthalic anhydride | 40 |
| Glycerol | 15 |
| Oleic acid | 20 |
| Ammonium bisulphate | 1 |

The mixture was heated to about 170° C. at which point a fairly vigorous reaction set in. Then the temperature was carried to 240° C. over a period of one-half hour to cause further reaction and polymerization. Vapors of acrolein were noted. The final product was a dark brown, soft material, transparent and very adhesive. It was found to be soluble in benzol and toluol and blended with nitrocellulose in a solvent mixture composed of equal parts of butyl acetate and toluol.

Stearic acid, as noted in Serial No. 609,136 likewise may be employed. Using stearic acid in the same proportions as the oleic acid and following out the procedure otherwise in a manner identical with the preceding example, a dark brown product slightly harder than the oleic product was secured. It was partially opaque, but gave a transparent film when incorporated in a solution of nitrocellulose.

The resins and balsams prepared in accordance with the foregoing may when reacted only to a stage where they are still soluble in organic solvents be employed in coating compositions. They may be used by themselves in a volatile solvent or mixture of solvents as for coating purposes. In such cases, pigments, drying oils, various other resins, and the like, may be added if desired. If the resinous materials are to be employed with nitrocellulose to form lacquers, it is desirable to neutralize the inorganic acid modifier of reaction. This may be done, for example, by adding a basic substance such as the oxide of an alkaline earth or the hydroxides of the fixed alkaline metals to a solution of the resin employing a quantity just sufficient to secure neutrality. Or, in some cases, when, for example, a basic pigment such as zinc oxide is to be used, the latter may likewise function as a neutralizing agent. If the composition is to be employed for coating wire or other metals, it is frequently desirable to secure such complete neutralization. When the resinous materials are employed in making molded articles by hot pressing, cold molding, and the like, it will not always be found necessary to previously secure neutralization. In addition to the inorganic basic substances as neutralizing agents, I may, in some cases, utilize organic bases such as the amines.

What I claim is:—

1. The process of making resinous materials which comprises reacting on a polyhydric alcohol with a polybasic acid in the presence of an inorganic acid body containing replaceable hydrogen.

2. The process of making resinous materials which comprises heating a reaction mixture containing glycerol, a carboxylic organic acid and an inorganic acid.

3. The process of making resinous materials which comprises heating a reaction mixture containing glycerol, phthalic anhydride, a higher fatty acid of an oily character and an inorganic acid body containing replaceable hydrogen.

4. The process of making resinous materials which comprises heating a reaction mixture containing a polyhydric alcohol, a crystalline carboxylic organic acid, higher fatty acids of an oily character and an inorganic acid body comprising ammonium bisulphate.

5. The process of making resinous material which comprises reacting on a polyhydric alcohol with a polybasic acid to form a resinous complex and treating the latter with an inorganic acid body containing replaceable hydrogen.

6. The process of making resinous materials which comprises heating a reaction mixture containing glycerol, phthalic anhydride, higher fatty oil acids and an inorganic acid body containing replaceable hydrogen.

7. The process of making resinous materials which comprises heating a reaction mixture containing glycerol, a heat stable carboxylic organic acid and an inorganic acid body containing replaceable hydrogen.

8. The process of making resinous materials which comprises heating a reaction mixture containing glycerol, an organic acid and fatty oils in the presence of an inorganic acid body.

9. The process of making resinous materials which comprises heating a reaction mixture containing glycerol, an organic acid, fatty oils and fatty oil acids in the presence of an inorganic acid body containing replaceable hydrogen.

10. Resinous material of polybasic acid-polyhydric alcohol derivation containing the residuum of an inorganic acid body containing replaceable hydrogen.

11. The resinous product resulting from the process of claim 1.

12. The process of making resinous materials which comprises heating a reaction mixture containing a polyhydric alcohol, and at least two organic carboxylic acids in the presence of an inorganic acid body containing replaceable hydrogen.

13. The process of making resinous materials which comprises heating a reaction mixture containing a polyhydric alcohol, and at least two organic carboxylic acids, one of which is monobasic, in the presence of an inorganic acid body.

14. The process of making resinous materials which comprises heating a reaction mixture containing a polyhydric alcohol, a crystalline organic carboxylic acid, and a fatty acid having from 16 to 18 carbon atoms in the molecule, in the presence of an inorganic acid.

15. The process of making resinous materials which comprises heating a reaction mixture containing glycerol, phthalic anhydride, and a fatty acid having at least 12 carbon atoms in the molecule, in the presence of an inorganic acid.

16. The process of making resinous materials which comprises heating a reaction mixture containing a polyhydric alcohol, a crystalline organic carboxylic acid, and an oxidized fatty acid, in the presence of an inorganic acid body.

17. The process of making resinous materials which comprises heating a reaction mixture containing a polyhydric alcohol, phthalic anhydride, and an oil-fatty acid, in the presence of an inorganic acid.

18. A resinous condensation product of a polyhydric alcohol with at least two organic carboxylic acids, prepared in the presence of an inorganic acid body.

19. A resinous condensation product of a polyhydric alcohol, and at least two organic carboxylic acids, one of which is monobasic, prepared in the presence of an inorganic acid body.

20. The resinous condensation product of glycerol, an organic crystalline carboxylic acid, and an oil-fatty acid produced in the presence of an inorganic acid body.

21. A condensation product of a polyhydric alcohol with an organic acid and a fatty oil, said condensation product containing the residuum of an inorganic acid body containing replaceable hydrogen.

22. A condensation product of a polyhydric alcohol, with an organic acid, a fatty oil and a fatty oil acid, said condensation product containing the residuum of an inorganic acid body containing replaceable hydrogen.

23. A condensation product of a polyhydric alcohol, an organic polybasic acid and an inorganic acid.

24. The product of claim 23 in which the acid comprises phosphoric acid.

25. The product of claim 23 in which the acid comprises silico-tungstic acid.

CARLETON ELLIS.